United States Patent [19]

Saito

[11] Patent Number: 5,202,808
[45] Date of Patent: Apr. 13, 1993

[54] MAGNETIC HEAD DEVICE WITH TAPE GUIDES FOR MAGNETIC TAPES

[75] Inventor: Akio Saito, Saitama, Japan

[73] Assignee: Pioneer Electronic Corporation, Saitama, Japan

[21] Appl. No.: 655,692

[22] Filed: Feb. 15, 1991

[30] Foreign Application Priority Data

Feb. 16, 1990 [JP] Japan .................................. 2-35464
Oct. 5, 1990 [JP] Japan .................................. 2-268007
Nov. 20, 1990 [JP] Japan .................................. 2-314805

[51] Int. Cl.⁵ ............................................ G11B 15/60
[52] U.S. Cl. ................................................ 360/130.21
[58] Field of Search ................................ 360/130.21; 242/197-200

[56] References Cited

U.S. PATENT DOCUMENTS 4,860,141  8/1989  Yoshimura ................ 360/130.21
4,962,438 10/1990  Kunze ...................... 360/130.21
5,016,132  5/1991  Okuda ...................... 360/130.21

FOREIGN PATENT DOCUMENTS 60-77006  5/1985  Japan .

Primary Examiner—A. J. Heinz
Attorney, Agent, or Firm—Nikaido, Marmelstein, Murray & Oram

[57] ABSTRACT

Tape guides are integrally formed on a supporting member made of synthetic resin. A magnetic head is secured to the supporting member. Each of the tape guides has a guide groove defined by opposite walls for guiding a magnetic tape.

9 Claims, 7 Drawing Sheets

MAGNETIC HEAD DEVICE WITH TAPE GUIDES FOR MAGNETIC TAPES

BACKGROUND OF THE INVENTION

The present invention relates to a magnetic head device having a magnetic head used for reading and recording signals on a magnetic tape in a cassette recorder.

It is necessary to keep the magnetic tape at a proper position with respect to a gap of the magnetic head in the cassette recorder. In a conventional cassette recorder, the position of the magnetic head can be adjusted so that the gap is located in place for the magnetic tape.

FIGS. 9 and 10 show an example of the conventional magnetic head. A magnetic head 1 has a pair of inside tape guides 2 secured thereto at opposite sides of the head. A pair of outside tape guides 7 are mounted on a base 5 for the magnetic head 1. Both the tape guides 2 and 7 have guide grooves 2a and 7a, respectively. The magnetic head 1 is mounted on a supporting plate 3 which is held on the base 5 by springs 4 in a floating state. The angular position of the head 1 with respect to a magnetic tape 8 is adjusted by rotating a screw 6 screwed in the base passing through the coil of the spring 4.

The magnetic tape 8 is guided by the guide grooves 2a and 7a so as to pass a gap 1a of the head 1, making a right angle with a center line of the gap 1a. However, the guide grooves 2a and 7a can not be aligned because of manufacturing tolerances of the parts. Although the azimuth of the magnetic head is adjusted by screws 6, it is difficult to finely adjust the azimuth. In addition the azimuth changes with time. Even if the azimuth is exact when the tape runs in the normal direction, there may occur that the azimuth in the reverse direction deviates.

Japanese Utility Model Laid Open 60-77006 discloses a magnetic head in which a pair of auxiliary tape guides are made of plastic and integral with each other. However, the azimuth of the magnetic head must be adjusted by rotating screws.

SUMMARY OF THE INVENTION

The object of the present invention is to provide a magnetic head in which tape guides are made integral with a supporting plate, so that the magnetic tape can be passed through a gap of the magnetic head, making a right angle with the gap, and hence azimuth adjustment is not necessary, thereby simplifying the assembling of the cassette recorder.

According to the present invention there is provided a magnetic head device comprising a supporting member made of synthetic resin and having tape guides integrally formed thereon, a magnetic head secured to the supporting member, each of the tape guides having a guide groove defined by opposite walls for guiding a magnetic tape passing the magnetic head.

In an aspect of the invention, the opposite walls comprises a perpendicular wall with respect to a bottom of the guide groove, and an inclined wall.

A bottom of the guide groove has a curved shape in section, which is inclined with respects to a running direction of the magnetic tape.

In another aspect of the invention, the tape guides comprise a pair of inside tape guides and a pair of outside tape guides, which are disposed on opposite sides of the magnetic head.

The other objects and features of this invention will become understood from the following description with reference to the accompanying drawings.

DETAILED DESCRIPTION OF THE PREFERRED EMBODIMENTS

Figure 1:
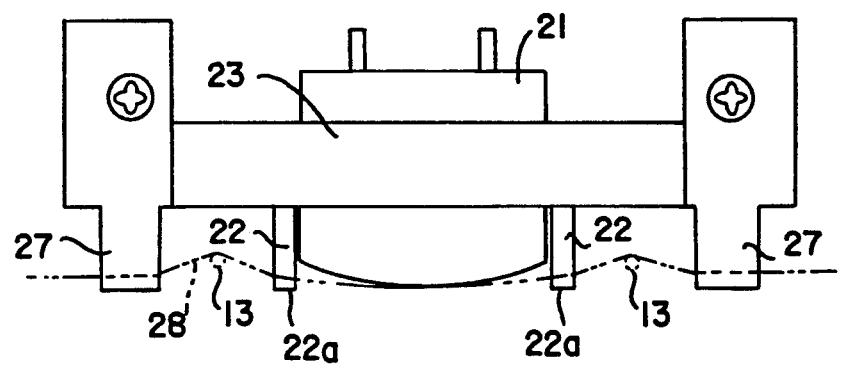
FIG. 1 is a plan view of a magnetic head device according to the present invention.
Figure 2:
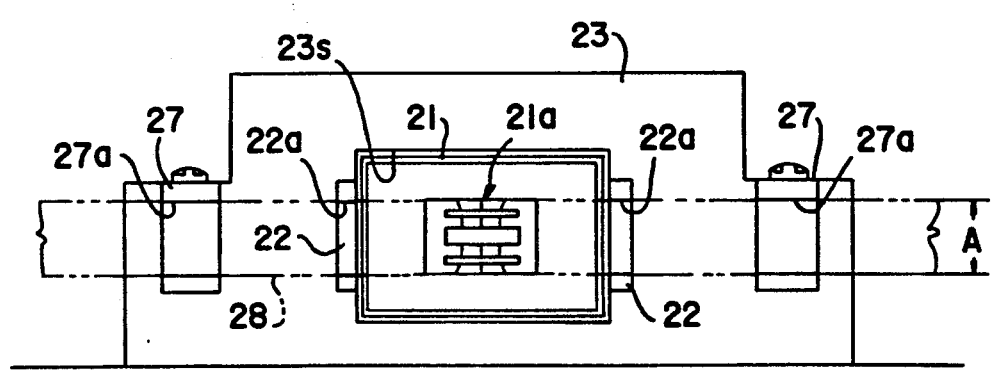
FIG. 2 is a front view of the magnetic head device.
Figure 7:
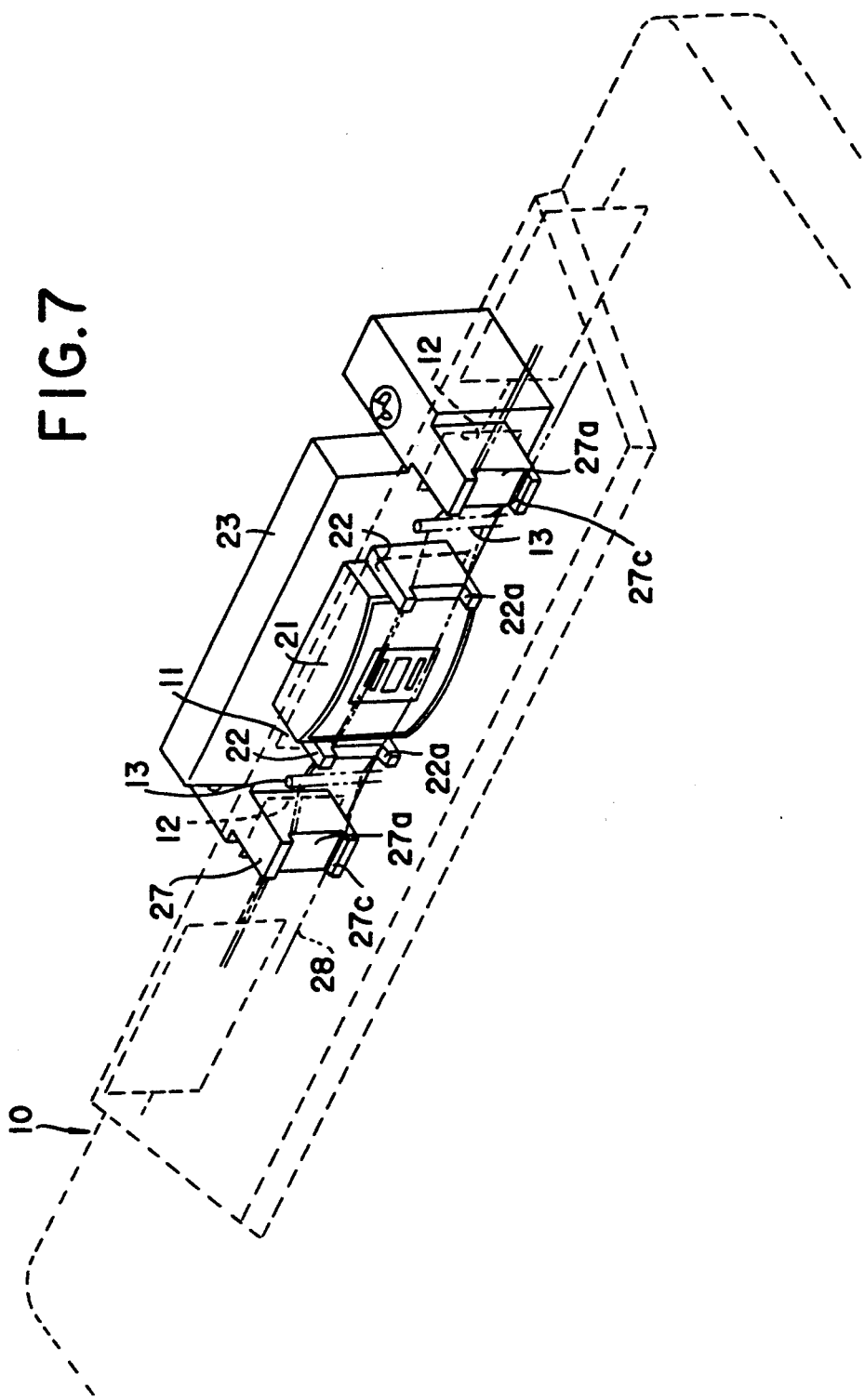
FIG. 7 is a perspective view of the magnetic head device.

Referring to FIGS. 1, 2 and 7, provided is a head supporting member 23 made of plastic and having an opening 23s for mounting a magnetic head 21. A pair of inside tape guides 22 are integrally formed on the head supporting member 23 at opposite sides of the opening 23s, and a pair of outside tape guide 27 are integrally formed on the supporting member 23 at opposite end portions thereof. The tape guide 27 is inserted into an opening 12 of a cassette half 10 as shown in FIG. 7.

A width A of the guide groove 27a of the tape guide 27 is finished with high accuracy. The width A for a magnetic tape 28 having a standard width of 3.76 to 3.81 mm is 3.79 to 3.83 mm. If the width A is smaller than 3.79, edges of the magnetic tape may be curled by walls of the guide groove, which will cause damage of the tape. If the width exceeds 3.83 mm, the tape can not be properly guided, which may incline the tape with respect to a center line of a gap of the magnetic head. Such an inclination of the tape causes a reduction of output of the magnetic head.

The output reduction can be expressed as follows.

$$\text{Output reduction} = 20 \log \left| \frac{\sin \frac{\pi \cdot w \cdot \tan \frac{\alpha}{60} \times \frac{2\pi}{360}}{\lambda}}{\frac{\pi \cdot w \cdot \tan \frac{\alpha}{60} \times \frac{2\pi}{360}}{\lambda}} \right|$$

where
 w is the width of a recording track (mm),
 $\lambda$ is the wave length (m),
 $\alpha$ is azimuth ('), and
 $\Delta L$ is the gap between the tape and the side wall of the guide groove.

Furthermore, $\Delta L = 28 \tan \alpha$.

Figure 3:
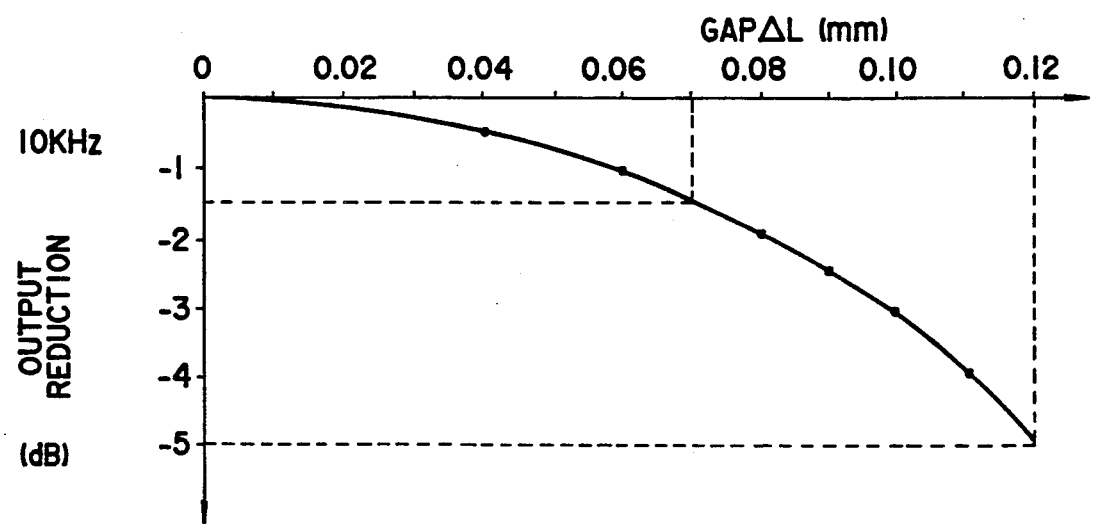
FIG. 3 is a graph showing a relationship between output reduction and a gap between a magnetic tape and a tape guide.

FIG. 3 shows a relationship between the output reduction and the gap $\Delta L$. If a maximum allowable output reduction is $-5$ dB at 10 kHz, the gap $\Delta L$ is 0.12 mm. A preferable output reduction in consideration of quantity production is −1.5 dB. Therefore the gap ΔL is 0.07 mm. Accordingly, a maximum width of the guide groove A is 3.83 mm.

The more the length of the guide groove 27a in the longitudinal direction of the tape 28 increases, the more running stability of the tape is ensured. Hence the guide groove has a length approximately equal to the width of the opening 12 of the cassette half 10 as shown in FIG. 7.

Figure 4A:
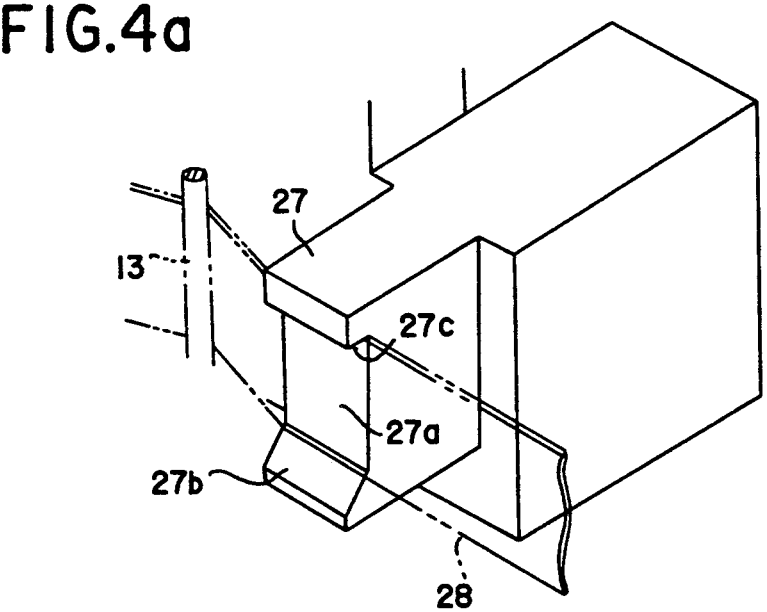
FIGS. 4a and 4b are perspective views showing an outside tape guide and an inside tape guide.
Figure 4B:
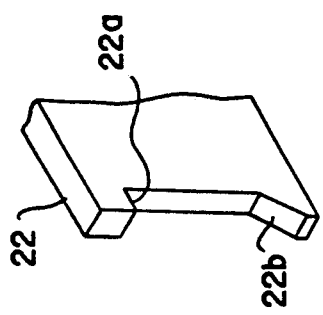

Although opposite walls 27c defining the guide groove 27a are perpendicular to the bottom of the groove as shown in FIG. 7, one of the walls 27c may be inclined as shown in FIG. 4a by reference 27b. The inclined wall 27b causes the magnetic tape to urge to the perpendicular wall 27c, thereby holding the tape in a predetermined path. As shown in FIG. 4b, a wall 22b of a guide groove 22a of the inside tape guide 22 may also be inclined.

Figure 5C:
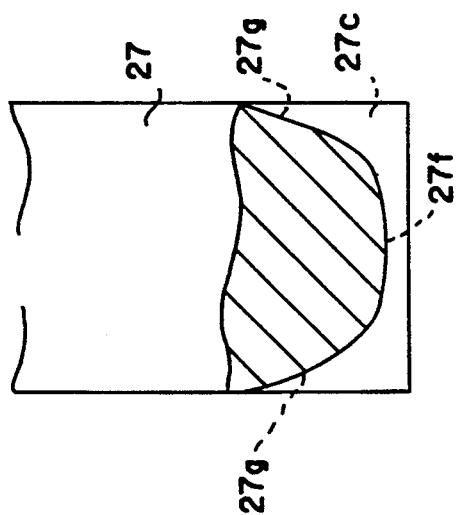
FIGS. 5a to 5c are plan views showing various guide grooves of tape guides partially in section.
Figure 5B:
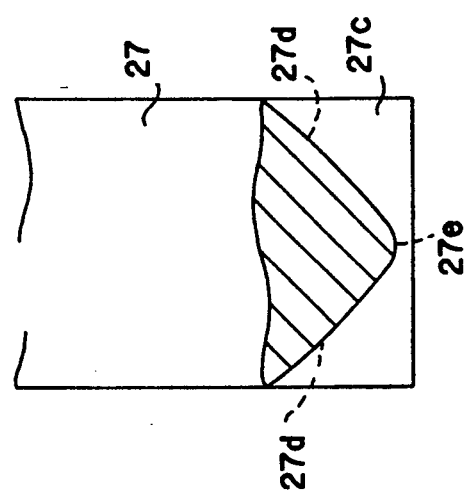
Figure 5A:
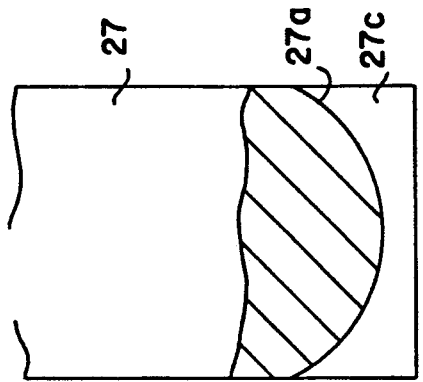
Figure 6:
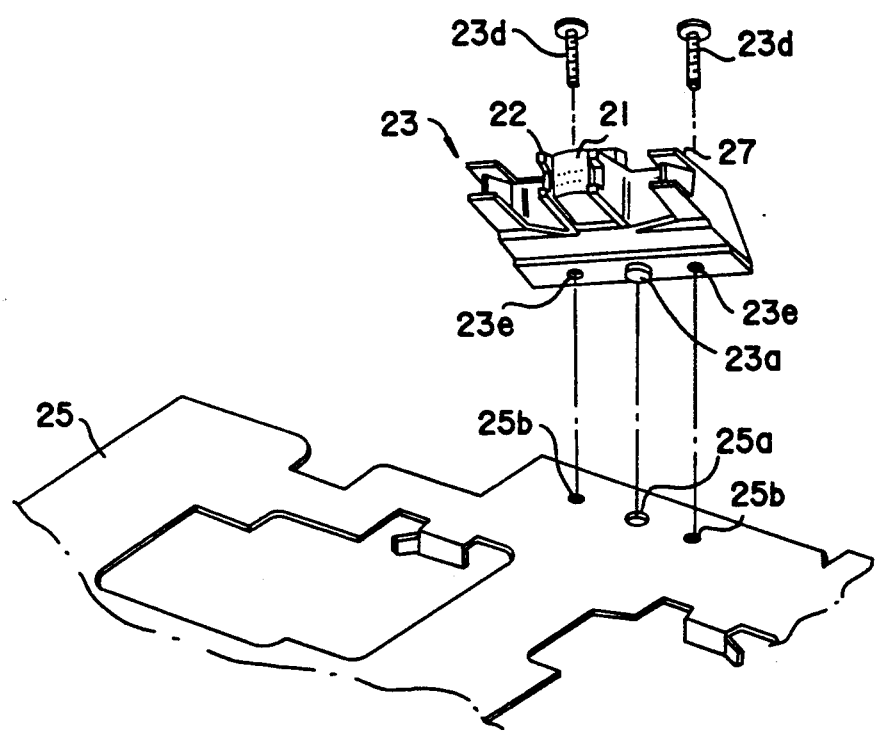
FIG. 6 is a perspective view for explaining attachment of the magnetic head device to a cassette recorder.

Referring to FIG. 5a, the bottom of the guide groove 27 may have a circular section in the running direction of the magnetic tape 28. Such a round bottom causes a constant contact with the tape. The bottom may have other round shapes shown in FIGS. 5b and 5c. The bottom of FIG. 5b has slightly curved sides 27d and a small round top 27e having a radius of about 0.2 mm, thereby reducing friction between the tape and the bottom. The bottom of FIG. 5c has a flat top 27f and curved sides 27g.

Although the inside tape guides 22 may be omitted, the guides are useful for keeping the tape horizontal. The guide grooves 22a and 27a of the tape guides 22 and 27 are aligned at accuracy within 5/100. The groove 22a has a width equal to or slightly larger than the groove 27a. The side wall of the groove 22a may be inclined wall like the inclined wall 27b.

The tape guides 22 and 27 integral with the supporting member 23 is made of synthetic resin selected from polyimide resin, polyester resin, acetal resins and polystyrene. Polyphenylen sulfide resin is preferably used because it has excellent adhesivity, chemical resistance, oil resistance, mechanical strength, and has a small thermal expansion coefficient and a low hygroscopicity.

The magnetic head 21 is inserted into the opening 23s of the supporting member 23 and fixed thereto with adhesives after the position and angular position of the head are adjusted. The magnetic head 21 may be secured to the supporting member 23 with screws or force fit. If the supporting member 23 and the magnetic head 21 are made with high accuracy, the magnetic head may be secured to the wall of the opening 23s without adjusting the position of the head. Furthermore, the head may be secured thereto by insert molding.

The supporting member 23 is mounted on a movable chassis 25 of a cassette recorder. The supporting member 23 has a positioning boss 23a on the underside thereof. On the other hand, the movable chassis 25 has an engaging hole 25a corresponding to the positioning boss 23a. The positioning boss 23a is engaged with the hole 25a and the supporting member 23 is secured to the movable chassis 25 with screws 23d which are passed through holes 23e of the supporting member 23 and engaged with threaded holes 25b of the chassis 25.

The movable chassis 25 with the magnetic head 21 is moved to the cassette half 10 when reproducing, so that the magnetic head 21 and tape guides 22 are inserted into an opening 11 of the cassette half 10 and the tape guides 27 are inserted into the opening 12. The magnetic tape 28 is urged to the magnetic head 21 by poles 13 provided in the cassette half 10 as shown in FIG. 7.

Figure 8:
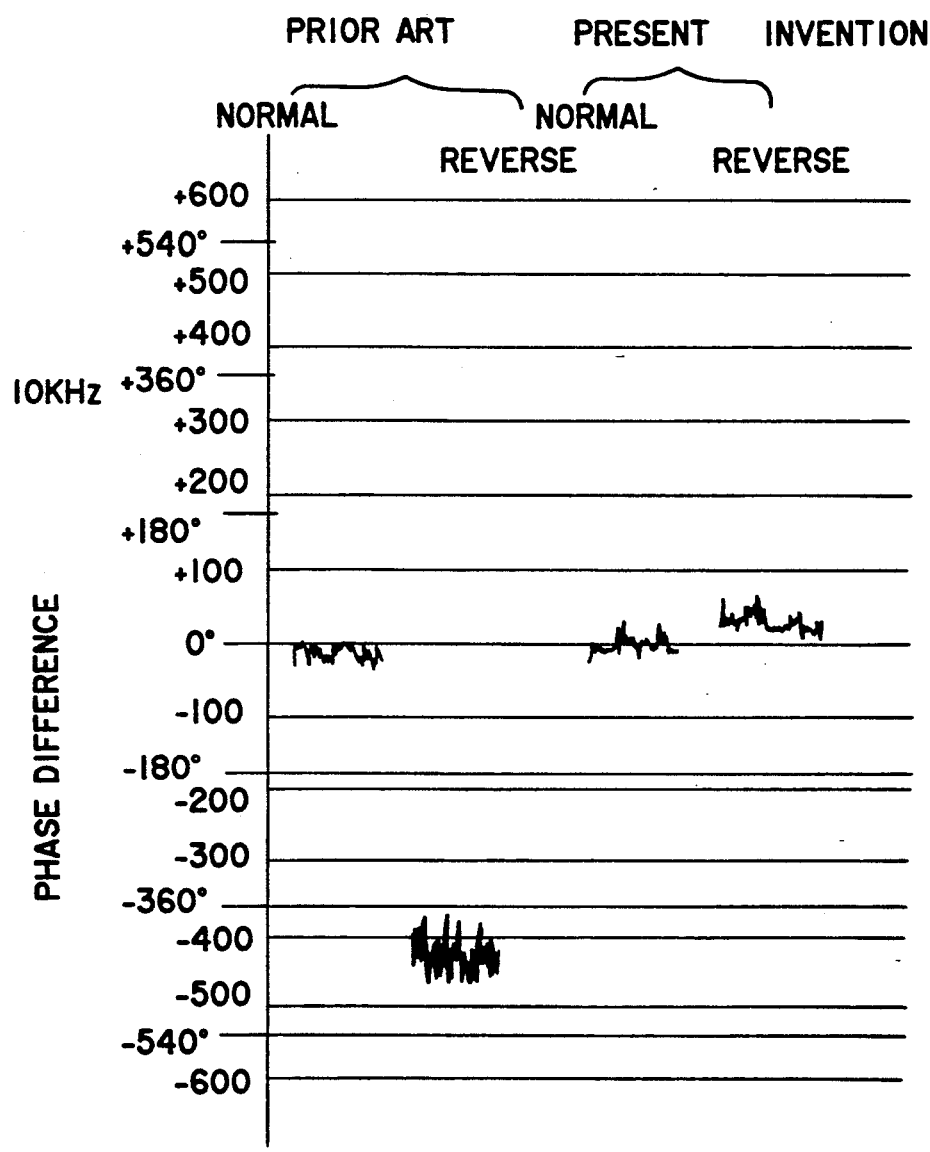
FIG. 8 is a graph showing characteristics of the magnetic head device of the present invention.
Figure 9:
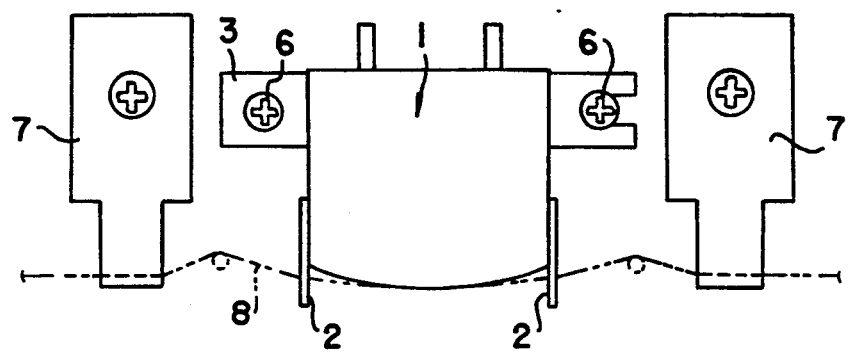
FIGS. 9 and 10 are a plan view and a front view of a conventional magnetic head device.
Figure 10:
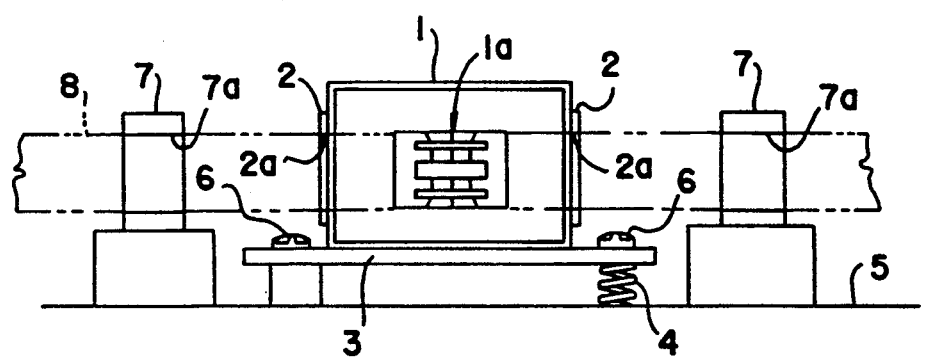

The cassette recorder provided with the magnetic head device of the present invention produces output signals without phase differences in the normal direction reproduction and in the reverse direction reproduction. FIG. 8 shows characteristics of the magnetic head device of the present invention and the conventional magnetic head device shown in FIGS. 9 and 10 when a magnetic tape of 10 kHz is reproduced. There is a large phase difference between the normal direction reproduction and the reverse direction reproduction with the conventional magnetic head device.

Since the cassette recorder described above is a bidirectional reproduction type, the tape guides 22 and 27 are provided at both sides of the magnetic head 21. In case of a monodirectional reproduction type, guides 22 and 27 are provided only on one side of the magnetic head, preferably on the downstream side of the magnetic head.

From the foregoing it will be understood that the present invention provides a magnetic head device in which tape guides are integral with a supporting member for the magnetic head, whereby azimuth adjustment is not necessary and hence the device can be easily assembled at a low cost.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A magnetic head device comprising:
    a head supporting member to be secured to a chassis of a recorder, the head supporting member having a) an opening and b) tape guide means which are integrally formed on said head supporting member, said tape guide means for guiding a magnetic tape;
    the tape guide means including a) a pair of inside tape guides and b) a pair of outside tape guides, the inside tape guides being disposed on opposite sides of the opening of the head supporting member; and
    a magnetic head secured to walls of the opening of the head supporting member.

2. The magnetic head device according to claim 1 wherein each of the tape guide means has a guide groove defined by opposite walls for guiding the magnetic tape passing the magnetic head.

3. The magnetic head device according to claim 2 wherein a bottom of the guide groove is flat.

4. The magnetic head device according to claim 2 wherein the opposite walls of the guide groove of either of the inside tape guides and outside tape guides comprises a perpendicular wall with respect to a bottom of the guide groove, and an inclined wall.

5. The magnetic head device according to claim 2 wherein a bottom of the guide groove has a curved shape in section, which is inclined with respects to a running direction of the magnetic tape.

6. The magnetic head device according to claim 2 wherein the guide groove of the outside tape guide has a longer length in a tape running direction than the inside tape guide.

7. The magnetic head device according to claim 1 wherein a bottom of the inside tape guide has a slightly larger width and the outside tape guide.

8. The magnetic head device according to claim 1 wherein a bottom of each outside tape guide has a width equal to that of the inside tape guide.

9. The magnetic head device according to claim 1 wherein the width of each tape guide is 3.79 mm to 3.83 mm.

* * * * *

(12) EX PARTE REEXAMINATION CERTIFICATE (5097th)
United States Patent
Saito

(10) Number: US 5,202,808 C1
(45) Certificate Issued: Apr. 19, 2005

(54) MAGNETIC HEAD DEVICE FOR MAGNETIC TAPES

(75) Inventor: Akio Saito, Saitama (JP)

(73) Assignee: Pioneer Electronic Corporation, Tokyo (JP)

Reexamination Request:
No. 90/005,952, Mar. 14, 2001

Reexamination Certificate for:
Patent No.: 5,202,808
Issued: Apr. 13, 1993
Appl. No.: 07/655,692
Filed: Feb. 15, 1991

(30) Foreign Application Priority Data

| | | |
|---|---|---|
| Feb. 16, 1990 | (JP) | 2-35464 |
| Oct. 5, 1990 | (JP) | 2-268007 |
| Nov. 20, 1990 | (JP) | 2-314805 |

(51) Int. Cl.$^7$ .................................................. G11B 15/60
(52) U.S. Cl. ................................................. 360/130.21
(58) Field of Search .......................... 360/130.2, 130.21, 360/130.3, 130.31, 130.32, 130.33; 242/346, 346.1, 346.2

(56) References Cited

U.S. PATENT DOCUMENTS 4,623,947 A * 11/1986 Kasahara ..................... 81/154

FOREIGN PATENT DOCUMENTS

| JP | 59-144061 | * 8/1984 |
| JP | 61-224112 | * 10/1986 |
| JP | 63-247950 | * 10/1988 |
| JP | 64-005209 | * 1/1989 |

\* cited by examiner

*Primary Examiner*—George Letscher

(57) ABSTRACT

Tape guides are integrally formed on a supporting member made of synthetic resin. A magnetic head is secured to the supporting member. Each of the tape guides has a guide groove defined by opposite walls for guiding a magnetic tape.

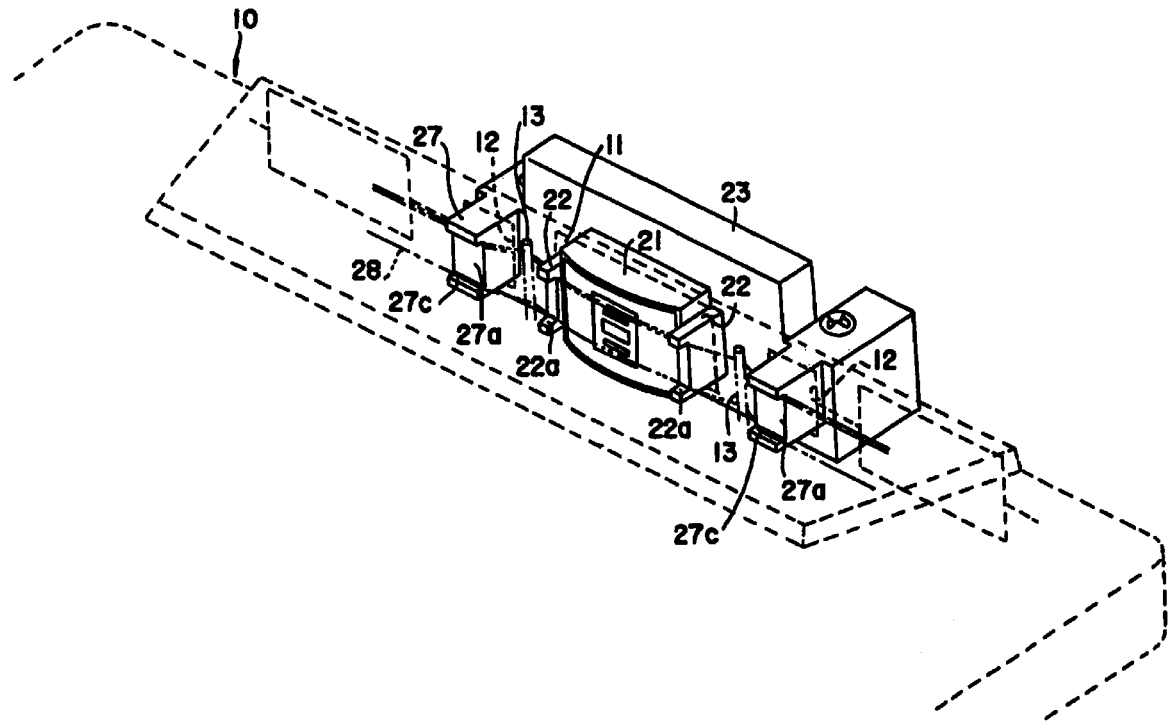

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5 and 7 are determined to be patentable as amended.

Claims 2–4, 6 and 8–9, dependent on an amended claim, are determined to be patentable.

New claims 10–19 are added and determined to be patentable.

1. A magnetic head device comprising:
   a *single piece* head supporting member to be secured to a chassis of a recorder, the head supporting member having a) an opening and b) tape guide means which are integrally formed on said head supporting member, said tape guide means for guiding a magnetic tape; the tape guide means including a) a pair of inside tape guides and b) a pair of outside tape guides, the inside tape guides being disposed on opposite sides of the opening of the head supporting member, *whereby azimuth adjustment is avoided*; and
   a magnetic head secured to walls of the opening of the head supporting member.

5. The magnetic head device according to claim 2 wherein a bottom of the guide groove has a curved shape in section, which is inclined with respect[s] to a running direction of the magnetic tape.

7. The magnetic head device according to claim 1 wherein a bottom of the inside tape guide has a slightly larger width [and] *than* the outside tape guide.

*10. A magnetic head device comprising:*
   *a single piece head supporting member having a bottom surface directly contacting and secured to a top surface of a chassis of a recorder, the head supporting member having*
   *a) an opening and*
   *b) tape guide means which are integrally formed on said head supporting member, said tape guide means for guiding a magnetic tape; the tape guide means including*
     *a) a pair of inside tape guides and*
     *b) a pair of outside tape guides, the inside tape guides being disposed on opposite sides of the opening of the head supporting member; and*
   *a magnetic head secured to the walls of the opening of the head supporting member.*

*11. The magnetic head device according to claim 10 wherein each of the tape guide means has a guide groove defined by opposite walls for guiding the magnetic tape passing the magnetic head.*

*12. The magnetic head device according to claim 11 wherein a bottom of the guide groove is flat.*

*13. The magnetic head device according to claim 11 wherein the opposite walls of the guide groove of either of the inside tape guides and outside tape guides comprises a perpendicular wall with respect to a bottom of the guide groove, and an inclined wall.*

*14. The magnetic head device according to claim 11 wherein a bottom of the guide groove has a curved shape in section, which is inclined with respect to a running direction of the magnetic tape.*

*15. The magnetic head device according to claim 11 wherein the guide groove of the outside tape guide has a longer length in a tape running direction than the inside tape guide.*

*16. The magnetic head device according to claim 10 wherein a bottom of the inside tape guide has a slightly larger width than the outside tape guide.*

*17. The magnetic head device according to claim 10 wherein a bottom of each outside tape guide has a width equal to that of the inside tape guide.*

*18. The magnetic head device according to claim 10 wherein the width of each tape guide is 3.79 mm to 3.83 mm.*

*19. The magnetic head device according to claim 1, wherein the head supporting member, the inside tape guides, and the outside tape guides are integrally formed from a synthetic resin.*

\* \* \* \* \*